(12) United States Patent
Yang

(10) Patent No.: US 11,283,132 B2
(45) Date of Patent: Mar. 22, 2022

(54) BATTERY PACK

(71) Applicant: SAMSUNG SDI CO., LTD., Yongin-si (KR)

(72) Inventor: Seohoon Yang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 152 days.

(21) Appl. No.: 16/495,188

(22) PCT Filed: Mar. 15, 2018

(86) PCT No.: PCT/KR2018/003040
§ 371 (c)(1),
(2) Date: Sep. 18, 2019

(87) PCT Pub. No.: WO2018/186604
PCT Pub. Date: Oct. 11, 2018

(65) Prior Publication Data
US 2020/0014001 A1 Jan. 9, 2020

(30) Foreign Application Priority Data

Apr. 6, 2017 (KR) .......... 10-2017-0044973

(51) Int. Cl.
*H01M 10/42* (2006.01)
*H01M 50/209* (2021.01)
*H01M 50/531* (2021.01)

(52) U.S. Cl.
CPC ....... *H01M 50/209* (2021.01); *H01M 10/425* (2013.01); *H01M 50/531* (2021.01); *H01M 2220/30* (2013.01)

(58) Field of Classification Search
CPC . H01M 50/209; H01M 50/531; H01M 10/425
See application file for complete search history.

(56) References Cited

U.S. PATENT DOCUMENTS 8,686,689 B2    4/2014 Lee
9,634,304 B2 *  4/2017 Kano ............... H01M 10/425
(Continued)

FOREIGN PATENT DOCUMENTS

CN    101800332 A    8/2010
CN    102082252 A    6/2011
(Continued)

OTHER PUBLICATIONS

International Search Report and Written Opinion, dated Jun. 27, 2018, for PCT/KR2018/003040 filed on Mar. 15, 2018.
(Continued)

*Primary Examiner* — Ula C Ruddock
*Assistant Examiner* — Thomas H. Parsons
(74) *Attorney, Agent, or Firm* — Lee IP Law, P.C.

(57) ABSTRACT

Provided is a battery pack. The battery pack includes: a bare cell including a bare cell main body including an electrode assembly and a sealing portion around the bare cell main body; a circuit board electrically connected to the bare cell and comprising a front surface portion opposite to the bare cell main body, wherein a chamfer portion that is inclined diagonally with respect to the front surface portion is formed at a side of the front surface portion; and a connection line extending via the chamfer portion of the circuit board. Accordingly, physical interference with a set device in which the battery pack is mounted may be avoided in the limited space of the set device, and damage to or a short circuit of the connection line which establishes an electrical connection with the set device may be prevented.

20 Claims, 14 Drawing Sheets

(56) References Cited

U.S. PATENT DOCUMENTS

| | | | |
|---|---|---|---|
| 9,806,305 | B2 | 10/2017 | Suzuki et al. |
| 2010/0203374 | A1 | 8/2010 | Kano |
| 2011/0127966 | A1 | 6/2011 | Lee |
| 2012/0276419 | A1 | 11/2012 | Park |
| 2014/0370355 | A1 | 12/2014 | Byun et al. |
| 2016/0141594 | A1 | 5/2016 | Hwang et al. |
| 2016/0233479 | A1* | 8/2016 | Ahn .................. H01M 50/531 |
| 2016/0336574 | A1 | 11/2016 | Guen et al. |
| 2017/0062794 | A1 | 3/2017 | Lee et al. |

FOREIGN PATENT DOCUMENTS

| | | | |
|---|---|---|---|
| CN | 105556709 A | | 5/2016 |
| CN | 106486713 A | | 3/2017 |
| DE | 102016205939 | * | 10/2017 |
| DE | 102016205939 A1 | * | 10/2017 |
| JP | 2009-218352 A | | 9/2009 |
| JP | 2010-118296 A | | 5/2010 |
| KR | 10-2012-0122860 A | | 11/2012 |
| KR | 10-1199107 B1 | | 11/2012 |
| KR | 10-1474741 B1 | | 12/2014 |
| KR | 10-1539691 B1 | | 7/2015 |
| KR | 10-2015-0106337 A | | 9/2015 |
| KR | 10-1559624 B1 | | 10/2015 |
| KR | 10-2016-0134236 A | | 11/2016 |

OTHER PUBLICATIONS

Korean Office action dated Mar. 18, 2021 for corresponding KR Patent Application No. 10-2017-0044973. All references previously cited.

Chinese Office action dated Oct. 9, 2021 for corresponding CN Patent Application No. 201880022806.7.

* cited by examiner

BATTERY PACK

CROSS-REFERENCE TO THE RELATED APPLICATION

This is the U.S. national phase application based on PCT Application No. PCT/KR2018/003040, filed Mar. 15, 2018, which is based on Korean Patent Application No. 10-2017-0044973, filed Apr. 6, 2017, the entire contents of all of which are hereby incorporated by reference.

TECHNICAL FIELD

One or more embodiments relate to a battery pack.

BACKGROUND ART

Camcorders, mobile phones, and tablet PCs, or the like have recently been widely used in accordance with the rapid progress in the electronics, communication, and computer industries. In this regard, the demand for high-performance secondary batteries having high reliability is increasing. To meet such demand, lithium secondary batteries are gaining more attention and are used in more diverse areas.

The related art regarding the present disclosure is disclosed in KR 10-1539691.

DESCRIPTION OF EMBODIMENTS

Technical Problem

One or more embodiments include a battery pack, wherein physical interference with a set device in which the battery pack is mounted may be avoided in the limited space of the set device, and the entire set device including the battery pack may be formed in a compact size.

One or more embodiments include a battery pack in which damage to or a short circuit of a connection line that establishes electrical connection with a set device is prevented.

Solution to Problem

A battery pack according to the present disclosure includes:

a bare cell including a bare cell main body including an electrode assembly and a sealing portion around the bare cell main body;

a circuit board electrically connected to the bare cell and including a front surface portion opposite to the bare cell main body, wherein a chamfer portion that is inclined in a diagonal direction with respect to the front surface portion is formed at a side of the front surface portion; and a connection line extending via the chamfer portion of the circuit board.

Advantageous Effects of Disclosure

According to a battery pack of the present disclosure, physical interference with a set device in the limited space of the set device may be avoided, and the entire set device in which the battery pack is mounted may be formed in a compact size.

According to the battery pack of the present disclosure, damage to or a short circuit of a connection line that establishes electrical connection between the battery pack and the set device may be prevented.

BEST MODE

Figure 1:
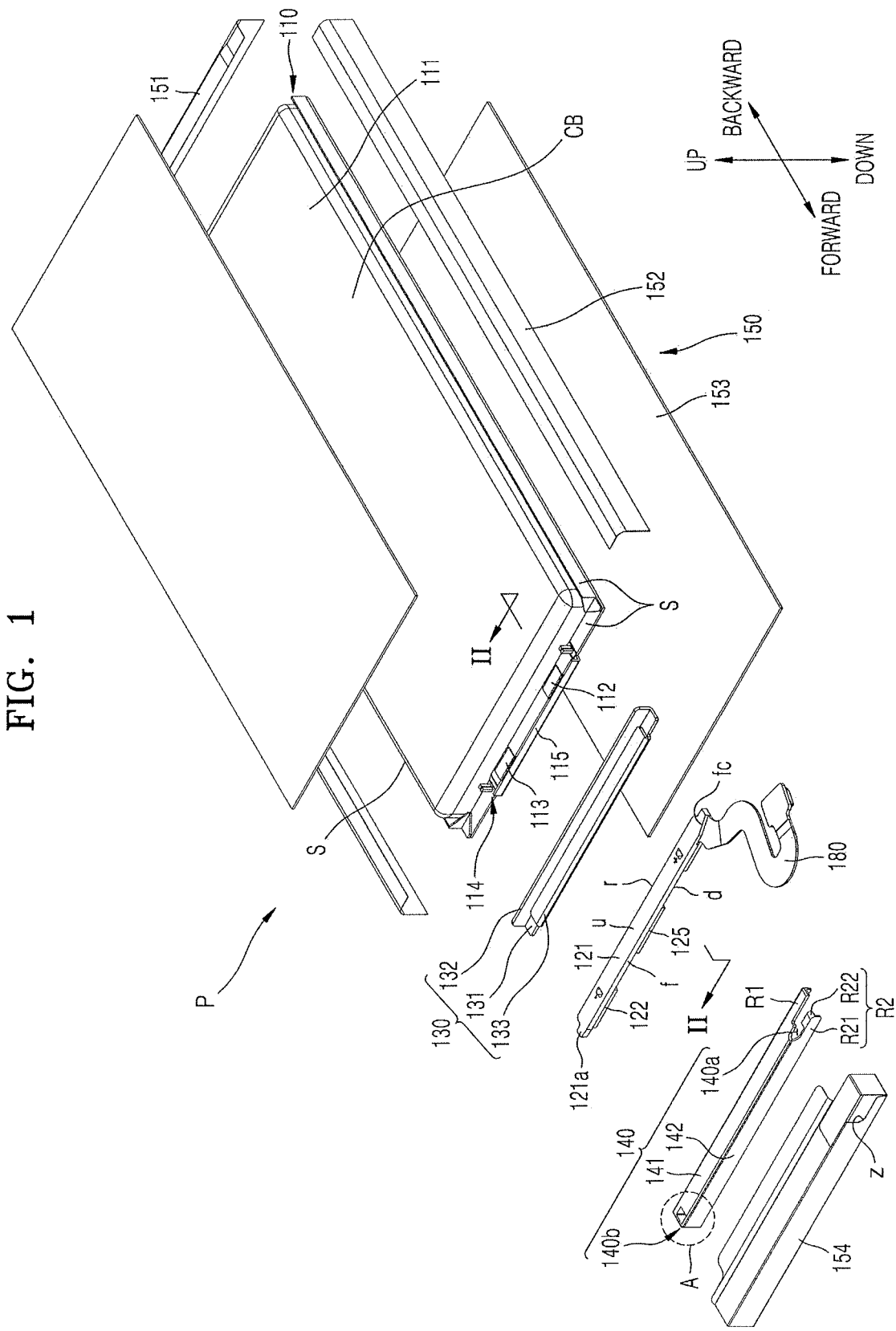
FIG. 1 is a disassembled perspective view of a battery pack according to an embodiment.

A battery pack according to the present disclosure includes:

a bare cell including a bare cell main body including an electrode assembly and a sealing portion around the bare cell main body;

a circuit board electrically connected to the bare cell and including a front surface portion opposite to the bare cell main body, wherein a chamfer portion that is inclined in a diagonal direction with respect to the front surface portion is formed at a side of the front surface portion; and a connection line extending via the chamfer portion of the circuit board.

For example, the chamfer portion may be formed at an end portion of the front surface portion of the circuit board.

For example, the chamfer portion may be formed obliquely toward an inner side of the circuit board.

For example, the connection line may integrally extend from the circuit board.

For example, the battery pack may further include a substrate holder covering at least two surfaces of the circuit board.

For example, the circuit board may further include an upper surface portion opposite to a terrace portion from which an electrode tab of the bare cell is withdrawn.

The substrate holder may include a first cover portion and a second cover portion respectively covering the upper surface portion and the front surface portion of the circuit board.

For example, the substrate holder may further include a withdrawing portion through which the connection line passes through.

For example, the substrate holder may include first and second ribs that respectively extend from the first and second cover portions to be apart from each other with the withdrawing portion therebetween.

For example, the first and second ribs may extend from the withdrawing portion by different lengths.

For example, the second rib may extend by a shorter length than the first rib, and an opening connected to the withdrawing portion may be formed outside the second rib.

For example, the first rib may extend from the first cover portion in parallel to the first cover portion to be arranged to face the upper surface portion of the circuit board.

The second rib may include a first portion extending from the second cover portion in parallel to the second cover portion and a second portion that is bent from the first portion and arranged to face a lower surface portion of the circuit board.

For example, the withdrawing portion may include an avoidance space that is led-in to expand into the inner side of the first rib.

For example, the withdrawing portion may be formed at a first end portion of the substrate holder.

An insertion portion into which the end portion of the circuit board is inserted and fixed is formed at a second end portion opposite to the first end portion of the substrate holder.

For example, the insertion portion of the substrate holder may surround five different surfaces of the end portion of the circuit board.

For example, the substrate holder may further include a third cover portion opposite to the first cover portion to interpose the end portion of the circuit board therebetween, a fourth cover portion opposite to the second cover portion to interpose the end portion of the circuit board therebetween, and a fifth cover portion covering an external surface of the end portion of the circuit board.

For example, the connection line may include at least one bending portion.

For example, the connection line may include a first end portion connected to the circuit board, an extension portion extending from the first end portion, and a second end portion which is an end portion of the extension portion opposite to the first end portion.

An end of the second end portion may be diagonally and obliquely arranged with respect to the front surface portion of the circuit board.

MODE OF DISCLOSURE

Hereinafter, a battery pack according to embodiments of the present disclosure will be described with reference to the attached drawings.

Figure 2:
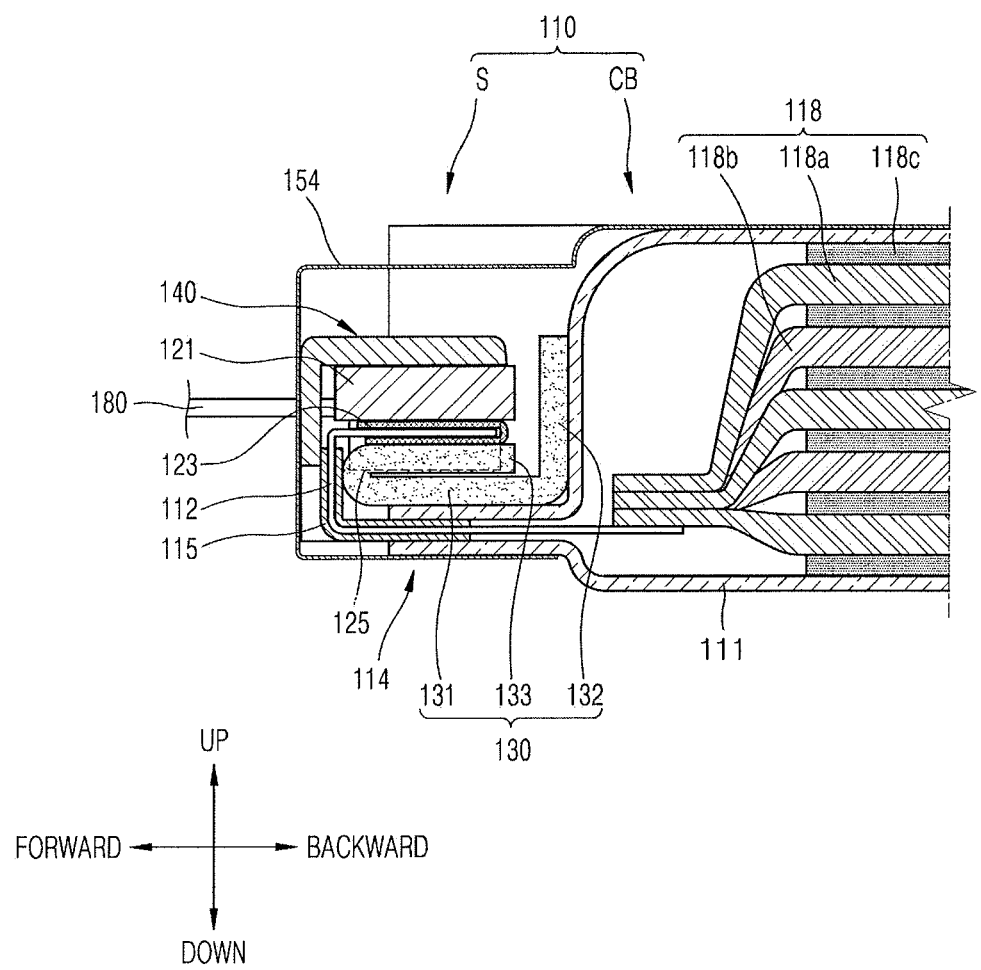
FIG. 2 is a cross-sectional view taken along line II-II of FIG. 1.

FIG. 1 is a disassembled perspective view of a battery pack according to an embodiment. FIG. 2 is a cross-sectional view taken along line II-II of FIG. 1.

Referring to FIGS. 1 and 2, the battery pack P may include a bare cell 110, a circuit board 121, an insulating portion 130, a substrate holder 140, and a protection member 150.

The bare cell 110 may include an electrode assembly 118, an exterior material 111 having a pouch shape surrounding the electrode assembly 118, and electrode tabs 112 and 113 withdrawn from the exterior material 111. The electrode tabs 112 and 113 may include a positive electrode tab 112 and a negative electrode tab 113, which have different polarities from each other. The electrode tabs 112 and 113 may be withdrawn to the outside via a terrace portion 114 of the bare cell 110 and may electrically connect the electrode assembly 118 in the bare cell 110 to the circuit board 121 outside the bare cell 110. An adhesive tab tape 115 may be arranged around the positive electrode tab 112 and the negative electrode tab 113 to increase sealing characteristics with respect to the exterior material 111 and provide electrical insulation from the exterior material 111.

The electrode assembly 118 may include a positive electrode plate 118a coated with a slurry which is for a positive electrode and includes a positive electrode active material, a negative electrode plate 118b coated with a slurry which is for a negative electrode and includes a negative active material, and a separator 118c between the positive electrode plate 118a and the negative electrode plate 118b.

Although not illustrated in the drawings, the positive electrode plate 118a may include a positive electrode active material layer, in which a positive electrode collector formed of a material such as aluminum is coated with a slurry for a positive electrode, and a positive electrode uncoated portion which is not coated with a slurry for a positive electrode. The slurry for a positive electrode includes a positive electrode active material. The positive electrode tab 112 is bonded to the positive electrode uncoated portion, and a portion of the positive electrode tab 112 may be withdrawn from the exterior material 111 to the outside.

Although not illustrated in the drawings, the negative electrode plate 118b may include a negative electrode active material layer, in which a negative electrode collector formed of a material such as nickel is coated with a slurry for a negative electrode, and a negative electrode uncoated portion which is not coated with a slurry for a negative electrode. The slurry for a negative electrode includes a negative electrode active material. The negative electrode tab 113 is bonded to the negative electrode uncoated portion, and a portion of the negative electrode tab 113 may be withdrawn from the exterior material 111 to the outside.

The separator 118c may include a material such as porous polypropylene (PP) or porous polyethylene (PE) to facilitate movement of lithium ions between the positive electrode plate 118a and the negative electrode plate 118b.

The exterior material 111 may be in a pouch shape and may include a metal foil (not shown) and an insulating layer (not shown) formed on each of upper and lower surfaces of the metal foil. For example, the metal foil may include a material such as aluminum or stainless steel.

The exterior material 111 may surround the electrode assembly 118, and by sealing a remaining portion of the exterior material 111 left after surrounding the electrode assembly 118, a bare cell main body CB including the electrode assembly 118 and a sealing portion S used to encapsulate the electrode assembly 118 around the bare cell main body CB may be formed. For example, the sealing portion S may include the terrace portion 114 from which the electrode tabs 112 and 113 are withdrawn and may also be formed on two lateral surfaces of the bare cell 110 in addition to the terrace portion 114.

The circuit board 121 may be seated on the terrace portion 114 of the bare cell 110. The circuit board 121 may be electrically connected to the bare cell 110 and prevent overheat and explosion occurring due to overcharging, over-discharging, or overcurrent of the bare cell 110 and may form a path for a charging or discharging current.

A circuit element 122, a positive electrode lead tab 123 (FIG. 2), a negative lead tab (not shown), and a safety element 125, or the like may be arranged on the circuit board 121. The circuit element 122, the positive electrode lead tab 123 (FIG. 2), the negative electrode lead tab (not shown), and the safety element 125, or the like may be arranged on a surface of the circuit board 121. According to an embodiment, the circuit element 122, the positive electrode lead tab 123 (FIG. 2), the negative electrode lead tab (not shown), and the safety element 125 or the like may be arranged on a lower surface (d) of the circuit board 121.

The positive electrode lead tab 123 (FIG. 2) may be electrically connected to the positive electrode tab 112 of the bare cell 110 via welding, and the negative electrode lead tab (not shown) may be electrically connected to the negative electrode tab 113 via welding.

When a temperature of the bare cell 110 increases to an allowable temperature or higher, the safety element 125 blocks a current, thereby preventing abnormal phenomena due to heat generated in the bare cell 110. A positive thermal coefficient (PTC) or a thermal cut-off device (TCO) may be used as the safety element 125.

The circuit board 121 may be seated on the terrace portion 114 of the bare cell 110 and may include an upper surface portion (u) opposite to the terrace portion 114 and a front surface portion (f) opposite to the bare cell main body CB. As will be described later, a chamfer portion (fc) may be formed on the front surface portion (f) of the circuit board 121, and a connection line 180 may be withdrawn via the chamber portion (fc).

Figure 8:
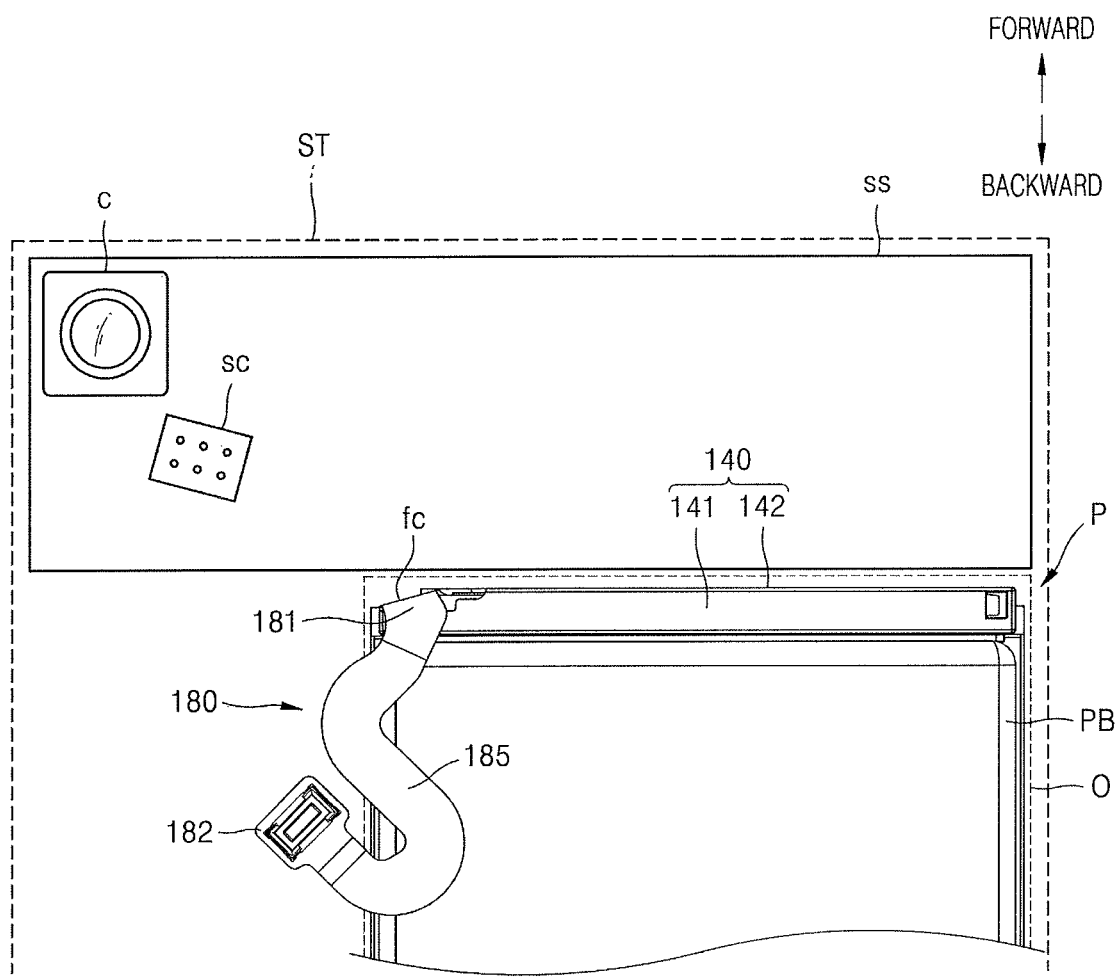
FIGS. 8 and 9 illustrate folding and unfolding of a connection line for mounting a battery pack.

The connection line 180 may extend from the circuit board 121 and function as a medium for an electrical connection between the circuit board 121 and a set device ST (FIG. 8). Detailed technical features of the connection line 180 will be described later.

The circuit board 121 may be accommodated in the substrate holder 140. The substrate holder 140 may cover at least two surfaces of the circuit board 121. For example, the circuit board 121 may include the upper surface portion (u) opposite to the terrace portion 114 of the bare cell 110 and the front surface portion (f) opposite to the bare cell main body CB, and the substrate holder 140 may include a first cover portion 141 covering the upper surface portion (u) of the circuit board 121 and a second cover portion 142 covering the front surface portion (f) of the circuit board 121. The first and second cover portions 141 and 142 may be each in a plate shape covering the upper surface portion (u) and the front surface portion (f) of the circuit board 121, respectively.

A withdrawing portion 140a for withdrawing the connection line 180 extending from the circuit board 121 may be formed at a first end portion of the substrate holder 140 in a length direction of the substrate holder 140. As will be described later, the withdrawing portion 140a may be formed between first and second ribs R1 and R2 respectively extending from the first and second cover portions 141 and 142 to allow the connection line 180 to pass therethrough.

An insertion portion 140b into which an end portion 121a of the circuit board 121 is inserted may be formed at a second end portion of the substrate holder 140 opposite to the first end portion thereof. The end portion 121a of the circuit board 121 is inserted into the insertion portion 140b of the substrate holder 140 to be fixed therein, and to this end, first through fifth covers portions 141, 142, 143, 144, and 145 (FIG. 3) may be formed in the insertion portion 140b to respectively surround and support five different surfaces of the end portion 121a of the circuit board 121.

Figure 3:
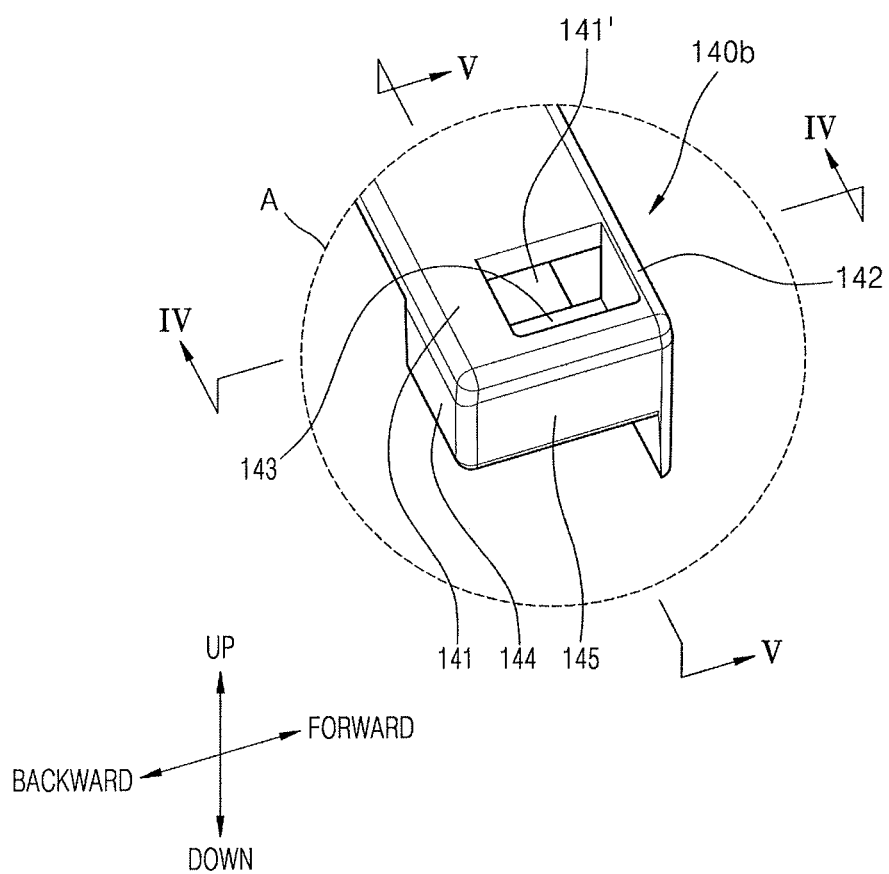
FIG. 3 is an enlarged perspective view of a region A of FIG. 1.
Figure 4:
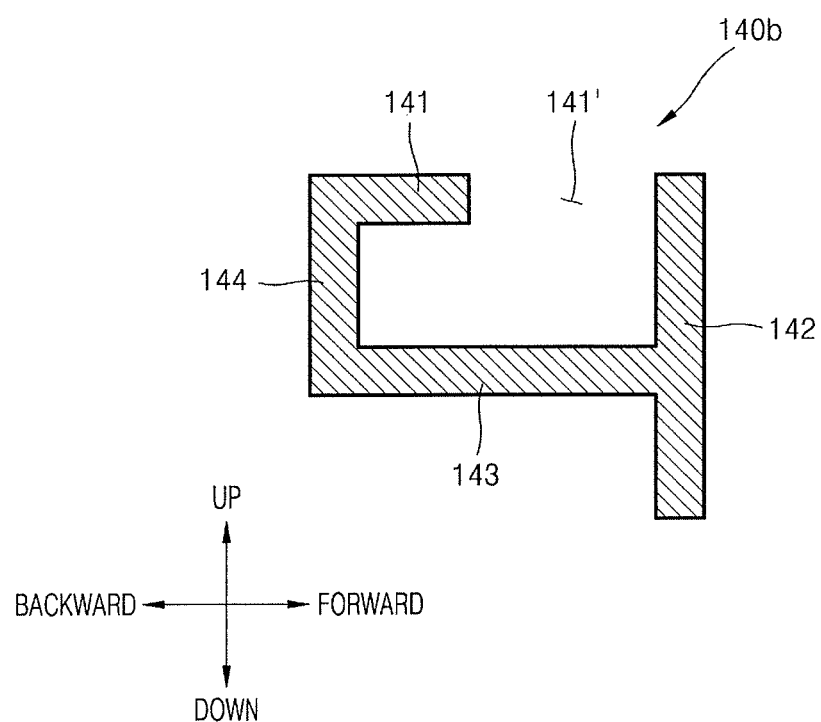
FIG. 4 is a cross-sectional view taken along line IV-IV of FIG. 3.
Figure 5:
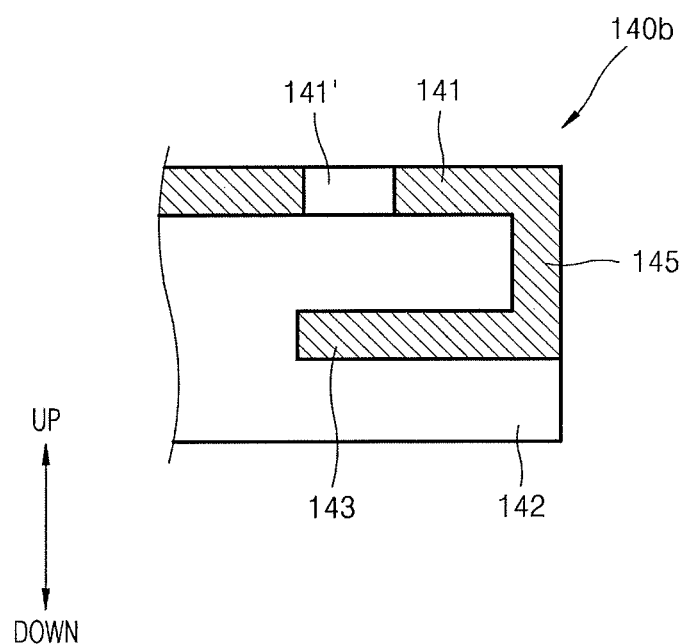
FIG. 5 is a cross-sectional view taken along line V-V of FIG. 3.

FIG. 3 is an enlarged perspective view of a region A of FIG. 1. FIGS. 4 and 5 are respectively cross-sectional views taken along line IV-IV and line V-V of FIG. 3.

Referring to FIGS. 3 through 5, in addition to the first and second cover portions 141 and 142, a third cover portion 143 opposite to the first cover portion 141 to interpose the end portion 121a of the circuit board 121 therebetween, a fourth cover portion 144 opposite to the second cover portion to interpose the end portion 121a of the circuit board 121 therebetween, and a fifth cover portion 145 covering an external surface of the end portion 121a of the circuit board 121 may be formed in the insertion portion 140b. The third cover portion 143 may be formed to cover the lower surface portion (d) of the end portion 121a of the circuit board 121 on the opposite side of the first cover portion 141. The fourth cover portion 144 may be formed to cover a rear surface portion (r) of the end portion 121a of the circuit board 121 on the opposite side of the second cover portion 142. The fifth cover portion 145 may be formed to cover the external surface of the end portion 121a of the circuit board 121.

The substrate holder 140 according to an embodiment includes the first through fifth cover portions 141, 142, 143, 144, and 145 that respectively cover the upper surface portion (u), the front surface portion (f), the lower surface portion (d), the rear surface portion (r), and the external surface of the end portion 121a of the circuit board 121 to fix the end portion 121a of the circuit board 121, thereby surrounding five different surfaces of the end portion 121a of the circuit board 121. The first through fifth cover portions 141, 142, 143, 144, and 145 of the substrate holder 140 may be each in a plate shape covering different portions of the end portion 121a of the circuit board 121.

Referring to FIGS. 1 through 3, the first and second cover portions 141 and 142 may be formed overall from the first end portion of the substrate holder 140 at which the withdrawing portion 140a is formed, to the second end portion where the insertion portion 140b is formed, and the third through fifth cover portions 143, 144, and 145 may be only selectively formed at the second end portion of the substrate holder 140 where the insertion portion 140b is formed and form the insertion portion 140b for fixing the end portion 121a of the circuit board 121.

In the insertion portion 140b of the substrate holder 140, the first and third cover portions 141 and 143 and/or the second and fourth cover portions 142 and 144 that are respectively opposite to each other may be spaced apart from each other by a size equal to or less than that of the end portion 121a of the circuit board 121, thereby allowing an interference fit of the end portion 121a of the circuit board 121 into the substrate holder 140. The end portion 121a of the circuit board 121 inserted into the insertion portion 140b of the substrate holder 140 may have a smaller width than other portions of the circuit board 121 to be easily inserted into the insertion portion 140b of the substrate holder 140. Meanwhile, a hole 141' may be formed in a position corresponding to the insertion portion 140b of the first cover portion 141, and an insertion operation of inserting the end portion 121a of the circuit board 121 may be viewed with the unaided eye.

Referring to FIGS. 1 and 2, the insulating portion 130 may be between the terrace portion 114 and the circuit board 121 and electrically insulate the bare cell 110 and the circuit board 121 from each other. The insulating portion 130 may have an overall shape in which at least one portion thereof is bent at least once.

In detail, the insulating portion 130 may include a first insulating portion 131, a second insulating portion 132, and a third insulating portion 133. The first insulating portion 131 may be arranged in parallel to an upper surface of the terrace portion 114 and attached to the upper surface of the terrace portion 114. The second insulating portion 132 forms an angle from the first insulating portion 131 and may be attached to a front surface of the bare cell main body CB. The third insulating portion 133 may be connected to the first insulating portion 131 and arranged in parallel to the first insulating portion 131. For example, the third insulating portion 133 may be bent from the first insulating portion 131 and stacked on the first insulating portion 131.

The third insulating portion 133 may be attached to the lower surface portion (d) of the circuit board 121 to face the circuit element 122, the positive electrode tab 112, the negative electrode tab 113, the positive electrode lead tab 123 (FIG. 2), and the negative electrode lead tab (not shown). As the first insulating portion 131 and the third insulating portion 133 are stacked on each other, the circuit board 121 and the bare cell 110 may be effectively insulated from each other. That is, as a two-layer insulating portion is between the circuit board 121 and the bare cell 110, an insulating material may have a relatively great thickness and insulating performance may be improved.

As illustrated in FIG. 1, the protection member 150 may include a first protection member 151, a second protection member 152, a third protection member 153, and a fourth protection member 154. The first protection member 151 may be arranged at a rear side of the bare cell 110. Also, the second protection member 152 may surround a lateral surface of the bare cell 110. Here, two second protection members 152 may be included to be arranged on each lateral surface of the bare cell 110. The third protection member 153 may be arranged on each of upper and lower surfaces of the bare cell 110. The fourth protection member 154 may surround the substrate holder 140 and the terrace portion 114. A hole (z) may be formed in the fourth protection member 154 such that the connection line 180 passes through the hole (z).

Figure 6:
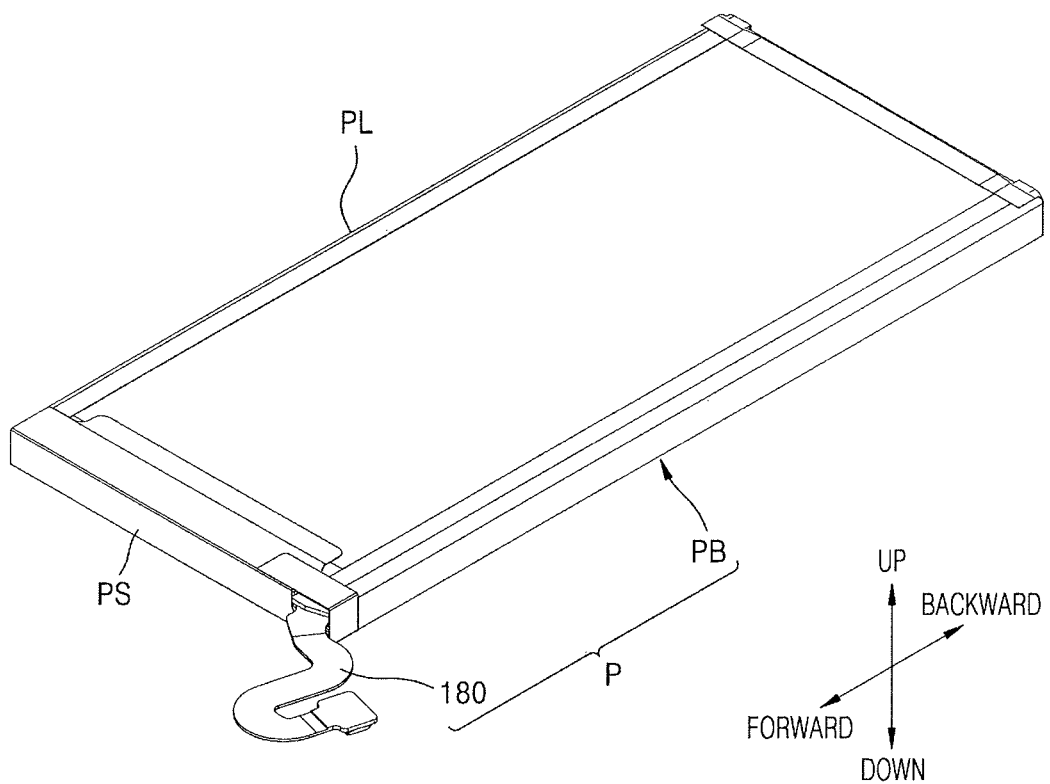
FIG. 6 is a perspective view of the battery pack of FIG. 1.

FIG. 6 is a perspective view of the battery pack P of FIG. 1.

Referring to FIG. 6, the battery pack P may include a pack main body PB and the connection line 180 extending from the pack main body PB. The pack main body PB may approximately have a rectangular parallelepiped shape including a pair of long side portions PL that are parallel to each other and a pair of short side portions PS that are between the long side portions PL and parallel to each other. The battery pack P may be mounted in a set device ST (FIG. 8) and supply driving power of the set device ST (FIG. 8). As will be described later, a battery accommodation space O (FIG. 8) having a shape matching with the pack main body PB may be provided in the set device ST (FIG. 8), and the connection line 180 may function as a medium for an electrical connection between the pack main body PB and the set device ST (FIG. 8).

Figure 7:
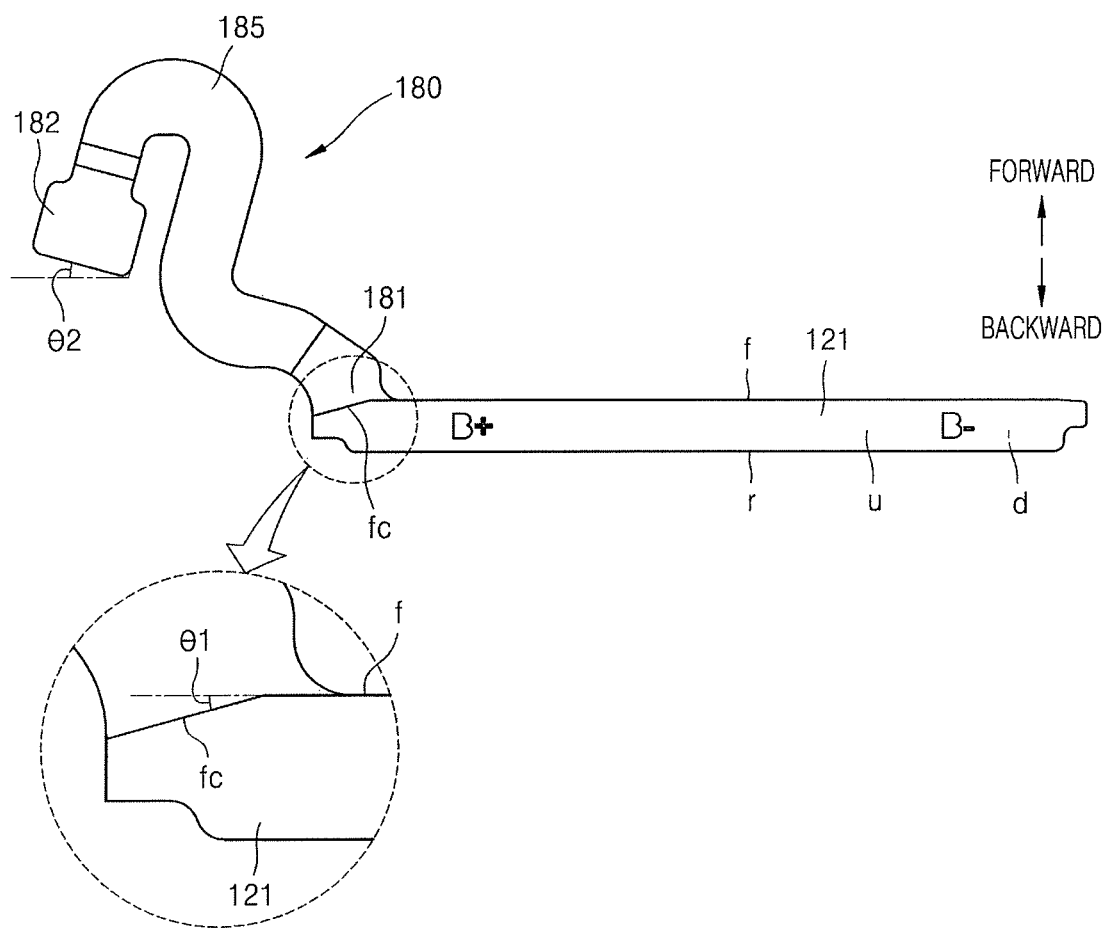
FIG. 7 is a circuit board from which a connection line is withdrawn.
Figure 9:
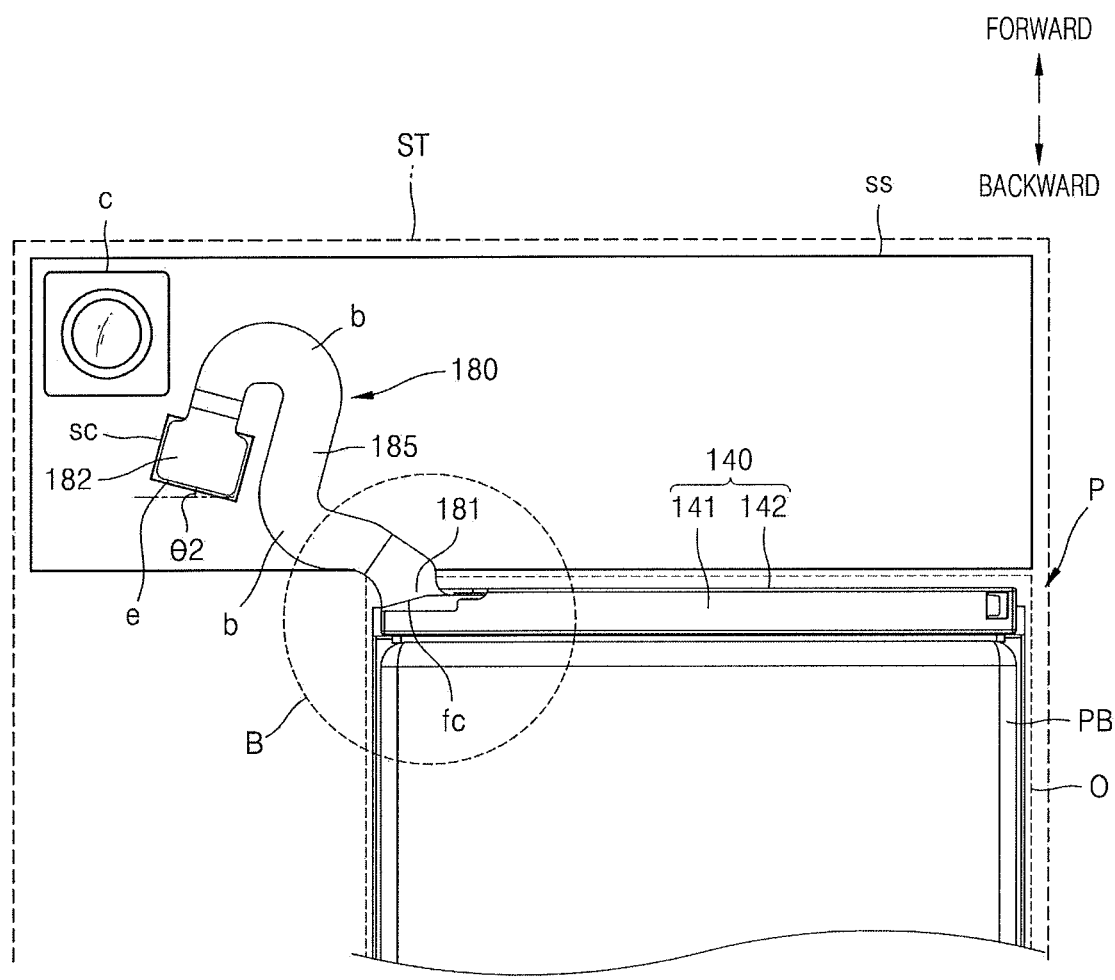
Figure 10:
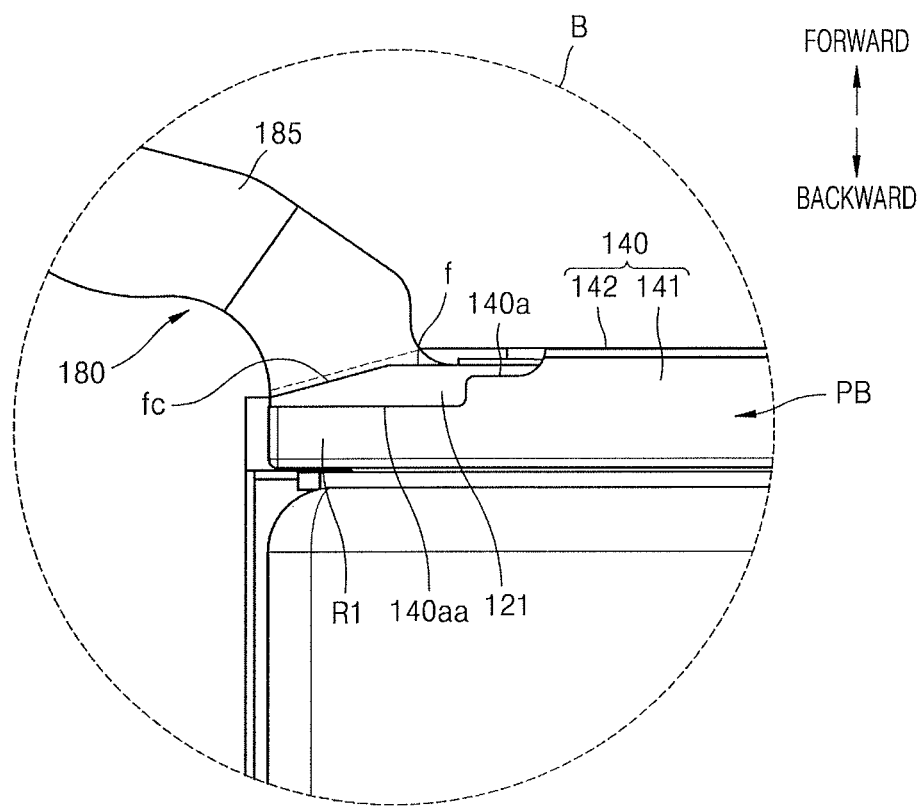
FIG. 10 is an enlarged view of a region B of FIG. 9.

FIG. 7 is the circuit board 121 from which the connection line 180 is withdrawn. FIGS. 8 and 9 illustrate folding and unfolding of the connection line 180 used in mounting the battery pack P. FIG. 10 is an enlarged view of a region B of FIG. 9.

Referring to FIG. 7, the connection line 180 may be integrally formed with the circuit board 121 and may be withdrawn out of the circuit board 121 to be connected to the set device ST (FIG. 8). The chamfer portion (fc) may be formed on the front surface portion (f) of the circuit board 121 from which the connection line 180 is withdrawn. The chamfer portion (fc) may be inclined diagonally with respect to the front surface portion (0 of the circuit board 121. In detail, the chamfer portion (fc) may be formed at an end portion of the front surface portion (f) and may have an inclination toward an inner side of the circuit board 121 to be led-in the circuit board 121. An inclination angle θ1 between the chamfer portion (fc) and the front surface portion (f) of the circuit board 121 may be in a range of 0 degrees <θ1<90 degrees. As will be described later, the chamfer portion (fc) of the circuit board 121 may facilitate mounting of the battery pack P and reduce the risk of a short circuit of the connection line 180.

Although not illustrated in the drawings, the circuit board 121 may include at least one wiring pattern layer (not shown) and an insulating layer (not shown) used to maintain insulating properties and rigidity of the wiring pattern layer (not shown), and may include, for example, two or more wiring pattern layers (not shown) and an insulating layer (not shown) interposed therebetween.

Although not illustrated in the drawings, depending on a detailed implementation form of the circuit board 121, the circuit board 121 may be designed in a multilayer structure in which a flexible substrate (not shown) and a rigid substrate (not shown) overlap each other. The connection line 180 is to be flexibly bent to be assembled with the set device ST (FIG. 8), and thus, the connection line 180 may have a shape where a portion of the flexible substrate (not shown) of the circuit board 121 is integrally extended.

Referring to FIGS. 8 and 9, the battery pack P is mounted in the set device ST and establishes an electrical connection with the set device ST. In detail, the battery pack P may establish an electrical connection with the set device ST via the connection line 180. The battery accommodation space O for mounting the battery pack P may be provided in the set device ST. A set circuit board SS that establishes an electrical connection with the battery pack P may be arranged adjacent to the battery accommodation space O. The set circuit board SS may conduct communication between the battery pack P and the set device ST and mediate a flow of charging or discharging current between the battery pack P and the set device ST, to control the battery pack P.

The battery pack P according to an embodiment may be mounted in a mobile device as a set device ST (for example, a mobile phone) and supply driving power to the mobile device. A plurality of electric elements may be mounted on the set circuit board SS. For example, a camera module C may be mounted on the set circuit board SS.

The battery pack P mounted in the battery accommodation space O may be electrically connected to the set circuit board SS via the connection line 180. In detail, the connection line 180 may establish an electrical connection between the battery pack P and the set circuit board SS as extending form the first end portion 181 connected to the pack main body PB to set circuit board SS and the second end portion 182, corresponding to the extended end portion, coupled to the connection portion SC on the set circuit board SS.

The battery accommodation space O provided in the set device ST may be in a size corresponding to a size of the pack main body PB, and no additional space for accommodating the connection line 180 extending from the pack main body PB may be provided. For example, the battery accommodation space O may have a rectangular shape matching with the pack main body PB. The battery accommodation space O may be a limited space, and as the battery pack P is mounted in the limited battery accommodation space O, the set device ST may have an overall compact size.

Mounting of the battery pack P may include an operation of inserting the battery pack P, specifically, the pack main body PB, into the battery accommodation space O and a connection operation to establish an electrical connection between the pack main body PB, which is inserted into the battery accommodation space O, and the set device ST. Here, in the inserting operation, as illustrated in FIG. 8, the connection line 180 is folded toward the pack main body PB such that the pack main body PB is completely accommodated in the battery accommodation space O and then may be unfolded from the pack main body PB toward the set circuit board SS in the connecting operation as illustrated in FIG. 9 to establish an electrical connection with respect to the set circuit board SS.

As illustrated in FIG. 8, the connection line 180 may be folded toward the pack main body PB such that the pack main body PB is completely accommodated in the limited battery accommodation space O. Accordingly, the connection line 180 overlaps over the pack main body PB so as not to protrude from the pack main body PB, and the pack main body PB may be completely accommodated in the battery accommodation space O. When the connection line 180 is folded over the pack main body PB, a folded portion of the connection line 180 may be formed within the pack main body PB such that the folded portion of the connection line 180 does not protrude from a corner portion of the pack main body PB. When the folded portion of the connection line 180 protrudes from the corner portion of the pack main body PB, the folding portion of the connection line 180 and a corner portion of the battery accommodation space O cause physical interference with each other.

According to the present disclosure, the chamfer portion (fc) is formed on the front surface portion (f) of the circuit board 121 from which the connection line 180 is withdrawn, and thus, when the connection line 180 is folded, the folded portion thereof may be formed within the pack main body PB. The chamfer portion (fc) may have an inclination toward the inner side of the circuit board 121 to be led-in the circuit board 121. By using the chamfer portion (fc) of the circuit board 121, the folded portion of the connection line 180 may be prevented from protruding to the outside of the pack main body PB, and as no portion of the connection line 180 protrudes from the pack main body PB, the pack main body PB may be accommodated in the battery accommodation space O without any portion deviating from the battery accommodation space O.

In the connection line 180, deformation in opposite directions, that is, folding and unfolding, is forced. After the connection line 180 is folded to overlap the pack main body PB, the connection line 180 is unfolded toward the outside of the pack main body PB, thus causing relatively large deformation and the risk of brittle deformation or damage to or a short circuit of the connection line 180. When the connection line 180 is damaged or short-circuited, it may be impossible to control a charging or discharging operation of the battery pack P or electrical resistance of a charging or discharging path may increase or the charging or discharging path may be disconnected, or a normal operation of the battery pack P may be impossible.

As illustrated in FIG. 10, according to the present disclosure, when folding or unfolding the connection line 180, the chamfer portion (fc) is formed on a boundary of the circuit board 121 (the front surface portion (f)) to guide deformation of the connection line 180, and thus, a deformation portion (dashed line) of the connection line 180 is obliquely formed along an inclination of the chamfer portion (fc) to have a relatively long length, and by increasing the length of the deformation portion (dashed line) when folding or unfolding of the connection line 180, the risk of a short circuit of the connection line 180 may be reduced.

The connection line 180 may be withdrawn out of the substrate holder 140 via the withdrawing portion 140a of the substrate holder 140. The withdrawing portion 140a of the substrate holder 140 may include an avoidance space 140aa not to interfere folding of the connection line 180. For example, the avoidance space 140aa may be formed at the first rib R1 that forms an upper surface of the pack main body PB. The first rib R1 may be adjacent to the withdrawing portion 140a of the substrate holder 140 to form a boundary of the withdrawing portion 140a. Detailed technical features of the first rib R1 of the substrate holder 140 will be described later.

For example, the avoidance space 140aa may have a stepped shape that is led-in to expand into the inner side of the first rib R1 so as not to interfere folding of the connection line 180 when the connection line 180 is folded over the pack main body PB. As the avoidance space 140aa has a shape expanding into the inner side of the first rib R1, that is, as the first rib R1 is moved to the rear, folding of the connection line 180 is not interfered by the first rib R1. The withdrawing portion 140a and the avoidance space 140aa may be connected to each other as a single space.

Figure 11:
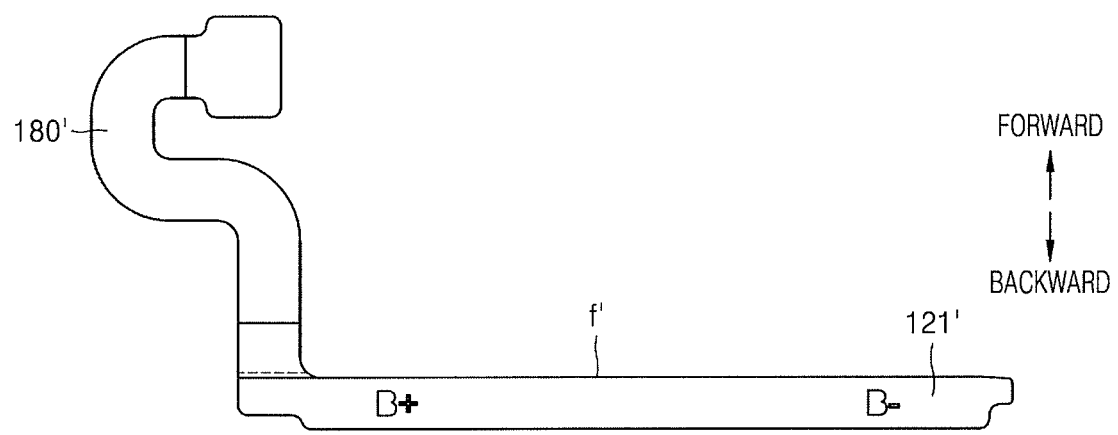
FIG. 11 is a view illustrating a withdrawal structure of a connection line according to a comparative example of the present disclosure.

FIG. 11 is a view illustrating a withdrawing structure of a connection line 180' according to a comparative example of the present disclosure.

Referring to FIG. 11, in the comparative example, a front surface portion (f) of a circuit board 121' from which the connection line 180' is withdrawn is horizontal along a straight line, and thus, when the connection line 180' is folded or unfolded, a deformation portion (dashed line) of the connection line 180' is horizontal and parallel to the front surface portion (f) of the circuit board 121'. On the other hand, according to the present disclosure, as illustrated in FIG. 10, when the connection line 180 is folded or unfolded, the deformation portion (dashed line) of the connection line 180 is oblique in a diagonal direction along an inclination of the chamfer portion (fc), and thus, the length of the deformation portion (dashed line) may be relatively long. When folding or unfolding the connection line 180, by forming the deformation portion (dashed line) of the connection line 180 having a relatively long length, stress applied to the connection line 180 per unit length may be distributed over a wide area and damage to the connection line 180 may be prevented.

As illustrated in FIG. 9, in the connecting operation of the battery pack P, the connection line 180 folded to overlap the pack main body PB is unfolded to be spread to the outside of the pack main body PB, and the second end portion 182 of the connection line 180 that is spread outside the pack main body PB is coupled to the connecting portion SC on the set circuit board SS to thereby establish an electrical connection between the battery pack P and the set device ST. The connection line 180 includes an extension portion 185 extending from the first end portion 181 connected to the pack main body PB to the second end portion 182 connected to the set circuit board SS, and the extension portion 185 may be bent in at least a portion thereof. For example, the extension portion 185 of the connection line 180 may include at least two bending portions (b). The bending portion (b) not just converts a direction of the connection line 180 but may allow the connection line 180 to have a connection distance that flexibly varies.

The extension portion 185 of the connection line 180 may be formed not linearly between the first end portion 181 connected to the pack main body PB and the second end portion 182 connected to the set circuit board SS but may include the bending portion (b) in at least one portion to thereby allow a flexible connection distance between the first and second end portions 181 and 182. As the extension portion 185 allows a flexible connection distance, tolerance between the pack main body PB and the set circuit board SS may be absorbed and a short circuit of the extension portion 185 may be prevented due to external vibration or impact.

A connection distance of the connection line 180, that is, a shortest distance from the first end portion 181 connected to the pack main body PB to the second end portion 182 connected to the set circuit board SS, is shorter than an extension length of the connection line 180 that bypasses via the bending portion (b). A plurality of electric elements, for example, the camera module C, may be mounted on the set circuit board SS. In addition, to prevent interference with the camera module C, the connecting portion SC of the set circuit board SS may be arranged adjacent to the battery accommodation space O. Accordingly, a connection distance between the second end portion 182 of the connection line 180 connected to the connecting portion SC of the set circuit board SS and the first end portion 181 of the connection line 180 connected to the pack main body PB in the battery accommodation space O is limited to a relatively short distance, and the connection line 180 may include a bending portion (b) in at least a portion thereof to allow a flexible connection distance between the first and second end portions 181 and 182. For example, the connection line 180 may have sections that overlap each other before and after the bending portion (b).

For example, the camera module C may be mounted at a corner portion of the set circuit board SS, and the connection line 180 may be extended only within a range that does not affect the camera module C to prevent interference with the camera module C. An end (e) of the second end portion 182 of the connection line 180 (FIG. 9) may have an inclination angle θ2 that is diagonally oblique with respect to the front surface portion (f) of the circuit board 121 from which the connection line 180 is withdrawn (or a virtual line parallel to the front surface portion (f) of the circuit board 121, and the second end portion 182 may avoid interference with the camera module C and ensure sufficient space. For example, when the end (e) of the second end portion 182 of the connection line 180 is arranged horizontally to be parallel to the front surface portion (f) of the circuit board 121 (θ2=0 degree), in the event of external oscillation or impact, interference may occur between electrical elements mounted on the set circuit board SS, for example, camera module C and the connection line 180.

Figure 12:
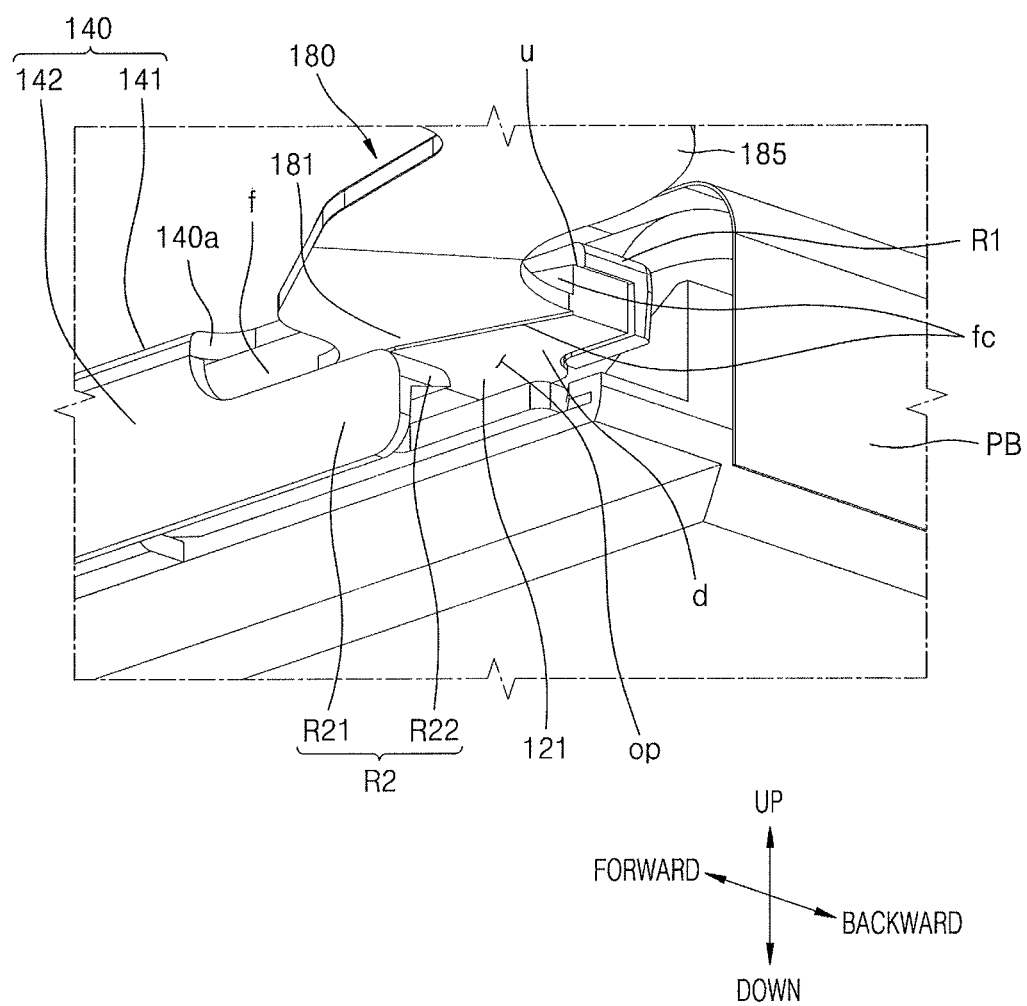
FIG. 12 is an enlarged perspective view of a withdrawing portion of a substrate holder illustrated in FIG. 1.
Figure 13:
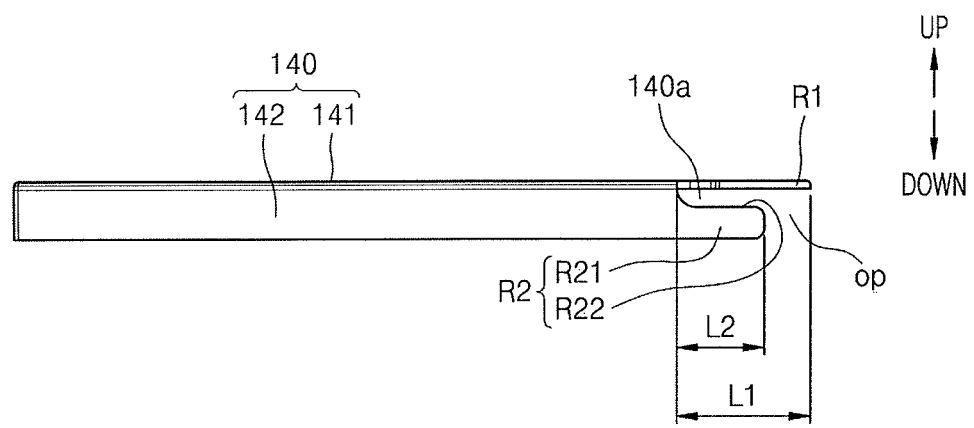
FIGS. 13 and 14 are views illustrating a front surface side and an upper surface side of the substrate holder illustrated in FIG. 12.
Figure 14:
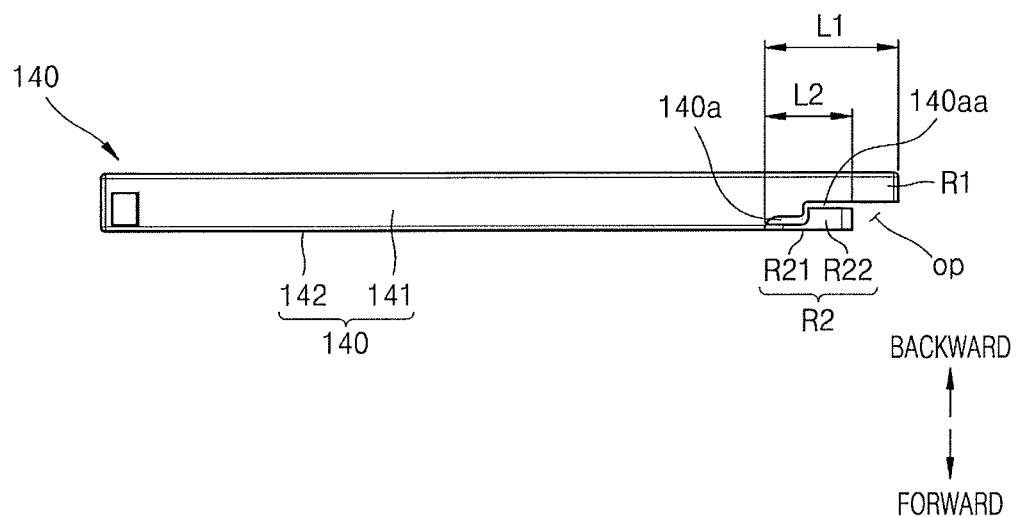

FIG. 12 is an enlarged perspective view of the withdrawing portion 140a of the substrate holder 140 illustrated in FIG. 1. FIGS. 13 and 14 are respectively views illustrating the substrate holder 140 illustrated in FIG. 12 from different sides, that is, front and upper surface sides thereof.

Referring to FIGS. 1 and 12 together, the circuit board 121 from which the connection line 180 is withdrawn is accommodated in the substrate holder 140, and the withdrawing portion 140a allowing the connection line 180 to pass through may be provided in the substrate holder 140. For example, the withdrawing portion 140a may be formed at the first end portion of the substrate holder 140. For example, the withdrawing portion 140a may not be formed in a center portion of the substrate holder 140 in a length direction of the substrate holder 140 but may be formed at the first end portion of the substrate holder 140. The withdrawing portion 140a of the substrate holder 140 may be formed at the first end portion of the substrate holder 140 to correspond to a position of the end portion of the circuit board 121 from which the connection line 180 is withdrawn. The insertion portion 140b into which the end portion 121a of the circuit board 121 (FIG. 1) is inserted and fixed therein may be formed at the second end portion of the substrate holder 140 opposite to the first end portion thereof.

The substrate holder 140 may cover at least two surfaces of the circuit board 121. For example, the substrate holder 140 may include the first and second cover portions 141 and 142 respectively covering the upper surface portion (u) and the front surface portion (f) of the circuit board 121. The first cover portion 141 may cover the upper surface portion (u) of the circuit board 121, and the second cover portion 142 may cover the front surface portion (f) of the circuit board 121.

The first and second ribs R1 and R2 may be formed adjacent to the withdrawing portion 140a of the substrate holder 140 from which the connection line 180 is withdrawn. Alternatively, the withdrawing portion 140a of the substrate holder 140 may be formed between the first and second ribs R1 and R2. The first and second ribs R1 and R2 may respectively extend from the first and second cover portions 141 and 142 of the substrate holder 140 and may extend to be apart from each other with the withdrawing portion 140a therebetween to form the withdrawing portion 140a. That is, the first and second cover portions 141 and 142 may form the first and second ribs R1 and R2 which extend in a length direction of the substrate holder 140 from the second end portion where the insertion portion 140b is formed toward the first end portion where the withdrawing portion 140a is formed and then are branched off from each other at a position of the first end portion of the substrate holder 140, from which the connection line 180 is withdrawn, with the withdrawing portion 140a therebetween.

The first and second ribs R1 and R2 may respectively support the upper surface portion (u) and the lower surface portion (d) of the circuit board 121. In detail, the first rib R1 may extend from the first cover portion 141 in parallel to the first cover portion 141 to be arranged to face the upper surface portion (u) of the circuit board 121 and support the upper surface portion (u) of the circuit board 121. Meanwhile, the second rib R2 may include a first portion R21 extending from the second cover portion 142 in parallel to the second cover portion 142 and a second portion R22 that is bent from the first portion R21 and arranged to face the lower surface portion (d) of the circuit board 121. As above, the first rib R1 and the second rib R2 (the second portion R22 of the second rib R2) may respectively support the upper surface portion (u) and the lower surface portion (d) of the circuit board 121. The upper surface portion (u) and the lower surface portion (d) of circuit board 121 may be supported between the first rib R1 and the second rib R2 (specifically, the second portion R22 of the second rib R2), and the connection line 180 may be withdrawn, via the withdrawing portion 140a, from the circuit board 121 that is stably supported.

Referring to FIGS. 12, 13, and 14, the first and second ribs R1 and R2 may extend by different lengths L1 and L2 from the withdrawing portion 140a. In detail, the second rib R2 extends by a relatively short length compared to the first rib R1, and an opening op connected to the withdrawing portion 140a may be formed outside the second rib R2. For example, the first rib R1 may be formed to completely cover the connection line 180, and the second rib R2 may have a relatively short length to overlap only a portion of the connection line 180. The opening op connected to the withdrawing portion 140a may be formed outside the second rib R2. Through the opening op, the connection line 180 may be easily inserted into the withdrawing portion 140a, and injection molding of the substrate holder 140 may be easily performed. For example, a mold used in injection molding of the substrate holder 140 may be easily separated via the opening op.

In other words, the withdrawing portion 140a that allows withdrawal of the connection line 180 is formed in the substrate holder 140 accommodating the circuit board 121, and the first and second ribs R1 and R2 that are adjacent to each other with the withdrawing portion 140a interposed therebetween may be arranged to face the upper surface portion (u) and the lower surface portion (d) of the circuit board 121 to support the circuit board 121. Here, the first and second ribs R1 and R2 may extend by the different lengths L1 and L2, and for example, the second rib R2 may extend by a relatively short distance that falls short of the first rib R1. Also, the opening op connected to the withdrawing portion 140a may be formed outside the second rib R2.

In the drawings of the specification, the first end portion 181 of the connection line 180 extending from the circuit board 121 extends approximately diagonally with respect to the front surface portion (f) of the circuit board 121. However, according to another embodiment, the first end portion 181 of the connection line 180 extending from the circuit board 121 may also extend vertically with respect to the front surface portion (f) of the circuit board 121. For example, according to another embodiment, as illustrated in FIG. 11, an end portion of the connection line 180' extending from the circuit board 121' may extend vertically with respect to the front surface portion (f) of the circuit board 121'. The technical details described above may also be practically equally applied to the modified embodiments.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

INDUSTRIAL APPLICABILITY

The present disclosure may be applied to a battery pack used as a rechargeable and dischargeable energy source and various devices that use the battery pack as a driving power supply.

The invention claimed is:

1. A battery pack, comprising:
a bare cell including a bare cell main body having an electrode assembly and a sealing portion around the bare cell main body;
a circuit board electrically connected to the bare cell, the circuit board including:
a flat front surface portion opposite to the bare cell main body, and
a chamfer portion that extends from a side of the flat front surface portion, the chamfer portion being inclined diagonally with respect to the front surface portion; and
a connection line connected to the circuit board via a first end portion, the first end portion of the connection line being directly attached to and overlapping the chamfer portion and a part of the flat front surface portion.

2. The battery pack as claimed in claim 1, wherein the chamfer portion is at an end portion of the front surface portion of the circuit board.

3. The battery pack as claimed in claim 1, wherein the chamfer portion extends obliquely toward an inner side of the circuit board.

4. The battery pack as claimed in claim 1, wherein the connection line integrally extends from the circuit board.

5. The battery pack as claimed in claim 1, further comprising a substrate holder covering at least two surfaces of the circuit board.

6. The battery pack as claimed in claim 5, wherein the circuit board further includes an upper surface portion opposite to a terrace portion from which an electrode tab of the bare cell is withdrawn, and the substrate holder includes a first cover portion and a second cover portion respectively covering the upper surface portion and the front surface portion of the circuit board.

7. The battery pack as claimed in claim 6, wherein the substrate holder further includes a withdrawing portion through which the connection line passes through.

8. The battery pack as claimed in claim 7, wherein the substrate holder includes first and second ribs that respectively extend from the first and second cover portions to be apart from each other with the withdrawing portion therebetween.

9. The battery pack as claimed in claim 8, wherein the first and second ribs extend from the withdrawing portion by different lengths.

10. The battery pack as claimed in claim 9, wherein the second rib extends by a shorter length than the first rib, and an opening connected to the withdrawing portion is outside the second rib.

11. The battery pack as claimed in claim 8, wherein the first rib extends from the first cover portion in parallel to the first cover portion to be arranged to face the upper surface portion of the circuit board, and the second rib includes a first portion extending from the second cover portion in parallel to the second cover portion and a second portion that is bent from the first portion and arranged to face a lower surface portion of the circuit board.

12. The battery pack as claimed in claim 8, wherein the withdrawing portion includes an avoidance space that is led-in to expand into the inner side of the first rib.

13. The battery pack as claimed in claim 7, wherein the withdrawing portion is at a first end portion of the substrate holder, and an insertion portion, into which the end portion of the circuit board is inserted and fixed, is at a second end portion opposite to the first end portion of the substrate holder.

14. The battery pack as claimed in claim 13, wherein the insertion portion of the substrate holder surrounds five different surfaces of the end portion of the circuit board.

15. The battery pack as claimed in claim 14, wherein the substrate holder further includes:
a third cover portion opposite to the first cover portion to interpose the end portion of the circuit board therebetween,
a fourth cover portion opposite to the second cover portion to interpose the end portion of the circuit board therebetween, and
a fifth cover portion covering an external surface of the end portion of the circuit board.

16. The battery pack as claimed in claim 1, wherein the connection line includes at least one bending portion.

17. The battery pack as claimed in claim 1, wherein:
the connection line includes the first end portion connected to the circuit board, an extension portion extending from the first end portion, and a second end portion which is an end portion of the extension portion opposite to the first end portion, and
an end of the second end portion is diagonally and obliquely arranged with respect to the front surface portion of the circuit board.

18. The battery pack as claimed in claim 1, wherein the connection line is foldable along a connection between the circuit board and the first end portion.

19. The battery pack as claimed in claim 1, wherein the first end portion of the connection line is directly attached to and overlaps an entire length of the chamfer portion along a direction oriented from the chamfer portion toward the flat front surface portion.

20. The battery pack as claimed in claim 1, wherein the first end portion of the connection line includes a single surface that contacts the circuit board.

* * * * *